(12) United States Patent
Choi

(10) Patent No.: US 8,255,586 B2
(45) Date of Patent: Aug. 28, 2012

(54) METHOD OF TRANSFERRING DATA BETWEEN VEHICLE AND PORTABLE TERMINAL AND INTERFACE DEVICE THEREFOR

(75) Inventor: Sung Up Choi, Hwasung-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/777,537

(22) Filed: May 11, 2010

(65) Prior Publication Data

US 2010/0293303 A1    Nov. 18, 2010

(30) Foreign Application Priority Data

May 13, 2009 (KR) .................. 10-2009-0041821

(51) Int. Cl.
*G06F 3/00* (2006.01)
*G06F 13/12* (2006.01)

(52) U.S. Cl. ............... 710/16; 710/15; 710/17; 710/18; 710/19; 710/65

(58) Field of Classification Search .......... None
See application file for complete search history.

(56) References Cited

U.S. PATENT DOCUMENTS

| | | | |
|---|---|---|---|
| 2005/0090942 A1* | 4/2005 | Shi | 701/1 |
| 2006/0059274 A1* | 3/2006 | Holloway et al. | 710/2 |
| 2006/0095626 A1* | 5/2006 | Tsay et al. | 710/301 |
| 2006/0265117 A1* | 11/2006 | Cahoon | 701/114 |
| 2006/0273878 A1* | 12/2006 | Michmerhuizen et al. | 340/5.72 |
| 2008/0281485 A1* | 11/2008 | Plante et al. | 701/35 |
| 2009/0016416 A1* | 1/2009 | Fenton et al. | 375/219 |
| 2009/0083450 A1* | 3/2009 | Peterson | 710/10 |
| 2009/0256690 A1* | 10/2009 | Golenski | 340/425.5 |
| 2009/0300243 A1* | 12/2009 | Chao | 710/71 |
| 2010/0049528 A1* | 2/2010 | Zeinstra et al. | 704/275 |

FOREIGN PATENT DOCUMENTS

| | | |
|---|---|---|
| KR | 10-2002-0080186 A | 10/2002 |
| KR | 10-2006-0044208 A | 5/2006 |
| KR | 10-2008-0051883 A | 6/2008 |

* cited by examiner

*Primary Examiner* — Henry Tsai
*Assistant Examiner* — Jing-Yih Shyu
(74) *Attorney, Agent, or Firm* — Sughrue Mion, PLLC (57) ABSTRACT

A method of transferring data between a vehicle and a portable terminal and an interface device therefor are provided. According to the method and the device, compatibility can be maintained by normalizing data transfer interface between the vehicle and various portable terminals and an image taken inside or outside the vehicle can be provided to the portable terminal. In addition, interface enabling data communication with a device having an additional function such as an automobile black box can be provided.

18 Claims, 5 Drawing Sheets

METHOD OF TRANSFERRING DATA BETWEEN VEHICLE AND PORTABLE TERMINAL AND INTERFACE DEVICE THEREFOR

CROSS-REFERENCE TO RELATED APPLICATIONS

This application claims priority from Korean Patent Application No. 10-2009-0041821, filed on May 13, 2009, in the Korean Intellectual Property Office (KIPO), the entire disclosure of which is incorporated herein by reference in its entirety.

BACKGROUND

1. Field

Methods and apparatuses consistent with the present inventive concept relate to data transfer technology, and more particularly, to a method and an apparatus of transferring data between a vehicle and a portable terminal with compatibility maintained by normalizing the interface for data transfer between the vehicle and the portable terminal.

2. Description of the Related Art

With the rapid development and the increasing diversity of vehicle multimedia systems, data transfer between vehicles and portable terminals has vigorously increased. Data has been transferred between portable terminals, such as iPod-pad/aux or Ford Sync, and vehicle audio/video systems using the universal serial bus (USB) or Bluetooth system. It is difficult, however, to transfer a large amount of data using such systems, and therefore, a new type of data transfer protocol is desired.

SUMMARY

Exemplary embodiments provide a method and device for maintaining compatibility by normalizing data transfer interface between a vehicle and various portable terminals.

Exemplary embodiments also provide a method and device for providing an image taken inside or outside a vehicle to a portable terminal.

According to an exemplary embodiment, there is provided a method of transferring data between a vehicle and a portable terminal. The method includes detecting connection of the portable terminal to the vehicle, determining whether the portable terminal includes interface enabling data transfer, setting a module necessary for the data transfer if the portable terminal is determined to comprise the interface, and starting the data transfer. The vehicle includes a controller that controls the detecting, the determining, the setting, and the starting.

The method may further include providing an application enabling the data transfer to the portable terminal if the portable terminal is determined not to have the interface enabling the data transfer.

The setting the module may include setting at least one module selected from an image module, a sensor module, and a car network module.

The method includes designating a channel to be used for the data transfer, where the designating the channel may include initializing the channel. The starting the data transfer may include converting the data using a transmission control protocol/Internet protocol (TCP/IP). The method may further include checking, by the controller, identification of the portable terminal; and if the checking determines that the identification of the portable terminal is not authenticated, the controller performs a control operation to provide an application enabling the data transfer to the portable terminal.

According to yet another exemplary embodiment, there is provided an interface device for transferring data between a vehicle and a portable terminal. The interface device includes an image interface module, implemented on a computer, which transmits an image taken inside or outside the vehicle to the portable terminal, a sensor interface module which transmits sensor data from at least one sensor installed at the vehicle to the portable terminal, and a car network interface module, which transmits at least one of car system data and multimedia system data to the portable terminal.

The interface device may further include a controller which checks identification of the portable terminal, designates a channel to be used for the data transfer, and controls the data transfer between the vehicle and the portable terminal. The controller may control the interface device to transfer the data using at least one module selected from the image interface module, the sensor interface module, and the car network interface module based on the identification of the portable terminal or a type of the data.

According to yet another exemplary embodiment, a method of transferring data between a vehicle and a portable device is provided. The method includes detecting the data for transfer if the portable device is connected to the vehicle via an interface unit; determining by the interface unit a communication protocol from the plurality of communication protocols for the transmission of data from a source to a memory based on format protocol of the data for transfer; and determining by the interface unit an interface module from a plurality of interface modules for the transmission of data from the vehicle to the portable device based on data content type.

According to yet another exemplary embodiment, an interface apparatus for facilitating transfer of data between a portable device and a vehicle is provided. The interface apparatus includes a processor executing software modules. The software modules include an image interface module which obtains image data from a memory and transmits the obtained data to the portable device; a sensor interface module which obtains sensor data from a memory and transmits the obtained data to the portable device; and a car network interface module which obtains electronics data provided to the memory from electronic units in the vehicle and transmits the obtained data to the portable device. The image interface module, the sensor interface module, and the car network interface module are each dedicated to a respective type of data.

BRIEF DESCRIPTION OF THE DRAWINGS

The above and/or other aspects will become more apparent by describing in detail exemplary embodiments thereof with reference to the attached drawings, in which.

DETAILED DESCRIPTION OF EXEMPLARY EMBODIMENTS

Below, exemplary embodiments will be described in detail with reference to the accompanying drawings. The present inventive concept may, however, be embodied in many different forms and should not be construed as limited to the exemplary embodiments set forth herein. Rather, these exemplary embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing exemplary embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
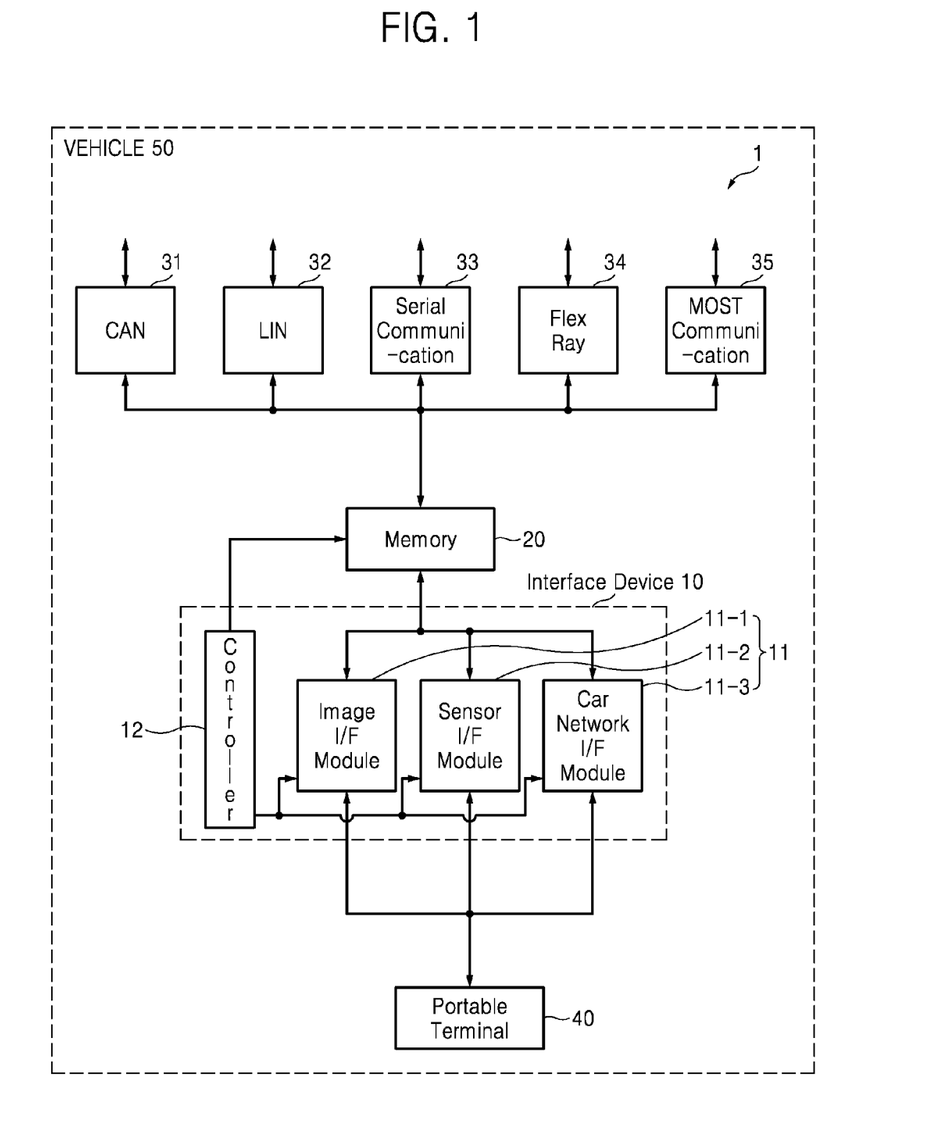
FIG. 1 is a schematic block diagram illustrating a data transfer system between a vehicle and a portable terminal according to an exemplary embodiment.

FIG. 1 is a schematic block diagram illustrating a data transfer system 1 between a vehicle 50 and a portable terminal 40 according to an exemplary embodiment. The data transfer system 1 includes an interface (I/F) device 10 which provides a data transfer path between the vehicle 50 and the portable terminal 40. The I/F device 10 may be implemented in a form of a slot, shuttle or base station so that the portable terminal 40 can be easily installed at or removed from the vehicle.

The portable terminal 40 may be any device that is implemented to be installed at or removed from the vehicle through the I/F device 10. For instance, the portable terminal 40 may be a cellular phone, a personal digital assistant (PDA), a portable multimedia player (PMP), a navigator, or a mobile television (TV), or automobile black box for recording car accident. Since data is transferred between the vehicle 50 and the portable terminal 40 via a wired connection, data transfer efficiency increases.

The I/F device 10 includes an image I/F module 11-1, a sensor I/F module 11-2, and a car network I/F module 11-3. Although the I/F device 10 is implemented in a single slot, it may include a plurality of independent modules 11-1 through 11-3 according to the types of data.

The image I/F module 11-1 provides a transfer path when an image that is taken inside or outside the vehicle, is transmitted from the vehicle 50 to the portable terminal 40 or an image is received from the portable terminal 40 by the vehicle 50. Image pickup devices may be provided inside and/or on an exterior of the vehicle 50. Images transmitted from the image pickup devices of the vehicle 50 may be stored in a memory 20 and a controller 12 may control the image I/F module 11-1 to transmit the images to the portable terminal 40. Images that can be transmitted through the image I/F module 11-1 may be an arbitrary type, e.g., complementary image sensor (CIS) images or charge-coupled device (CCD) images.

The sensor I/F module 11-2 provides a path for the data sensed by various sensors installed in the vehicle 50, to be transmitted to the portable terminal 40. The vehicle 50 may be equipped with a variety of sensors for obtaining a wide variety of information. Sensor data output from these sensors can be transmitted to the portable terminal 40 through the sensor I/F module 11-2. The sensors may include a temperature sensor sensing the temperature inside the vehicle 50, sensing the temperature of the engine or hood of the vehicle 50, a hydraulic sensor which senses the amount of fuel present in the fuel tank, a pressure sensor which senses the air pressure of a tire, a humidity sensor which senses humidity inside the vehicle 50 or at some other location, and an illumination sensor, which senses light inside the vehicle 50 or at some other location.

The car network I/F module 11-3 provides a path for transmitting one or more of multimedia system data and car system data to the portable terminal 40. The vehicle 50 may be equipped with a variety of electronics such as an electronic time alarm control system (ETACS), a door driving module (DDM), an assist door module (ADM), an inpanel unit, an airbag unit, a Navi set, and various multimedia equipment (e.g., a TV set, a digital versatile disc changer (DVDC), a compact disc changer (CDC), a radio unit, and an amplifier unit). These electronics can transmit and receive data using an electronic control unit (ECU) and network communication. A network communication protocol for vehicles used at this time is a controller area network (CAN) protocol. Accordingly, the car system data or the multimedia system data, which is based on the CAN protocol, is transmitted to the portable terminal 40 through the car network I/F module 11-3. Besides data based on the CAN protocol, data based on a local interconnect network (LIN), serial communication, FlexRay, or media oriented systems transport (MOST) communication can also be transferred using the system described in an exemplary embodiment.

The controller 12 may control at least one of the I/F modules 11-1 through 11-3 to be activated when data communication with the portable terminal 40 is performed. As is mentioned above, although the I/F modules 11-1 through 11-3 are implemented together in a single slot, they may be independent from each other according to the types of data.

Meanwhile, various data on the vehicle may be stored in the memory 20 using various blocks 31 through 35, which are exemplary communication blocks that communicate with the vehicle 50 and the interface device 10. The blocks 31 through 35 may be classified according to the type of data communication. In an exemplary embodiment, the memory 20 may include a plurality of memory units independently implemented according to the type of data communication.

In detail, fuel-efficiency data, misfire data, and sensor data obtained from sensors installed in the vehicle may be permanently or temporarily stored in the memory 20 through a CAN 31, a LIN 32, a serial communication unit 33, a FlexRay unit 34, or a MOST communication unit 35. The CAN 31 may enable data exchange among a control unit, sensors, and actuators of the vehicle and may be used for vehicle management, chassis, and electronics. The CAN 31 is a communication device aimed at quick transfer of information among microcomputers (not shown) installed in the vehicle. It allows all the necessary information to be exchanged among the controllers. When additional information is required by a controller, it works only by changing software without changing hardware.

A LIN 32 enables data to be transferred using a LIN protocol. The LIN 32 has a speed of 20 kbps or less and is used for equipment, such as doors, mirrors, windows, wipers, and headlights, which require a response speed that is not relatively fast.

The serial communication unit 33 provides state information of a device that uses serial communication in the vehicle. The FlexRay unit 34 provides state information of a device that uses FlexRay in the vehicle. FlexRay is a new protocol which has a high data rate of up to 10 Mbps and enables efficient communication among ECUs which control power systems like a car engine and ECUs which control chassis such as a break and steering systems.

The MOST communication unit 35 provides vehicle information using a MOST communication protocol. The MOST communication is a vehicle multimedia network communication standard used for data communication of a navigation system, an audio/video system, a speaker, an AutoPC, a digital multimedia broadcasting (DMB) receiver, telematics device, and so on in the vehicle at a data rate of up to 24.5 Mbps.

In the interface between the vehicle and the portable terminal 40, data may be converted using a transmission control protocol/Internet protocol (TCP/IP) and then transmitted to the portable terminal 40. When vehicle data is converted using the TCP/IP, a data conversion operation is simplified, conversion efficiency is enhanced, and the data is readily used in various standards.

Figure 2:
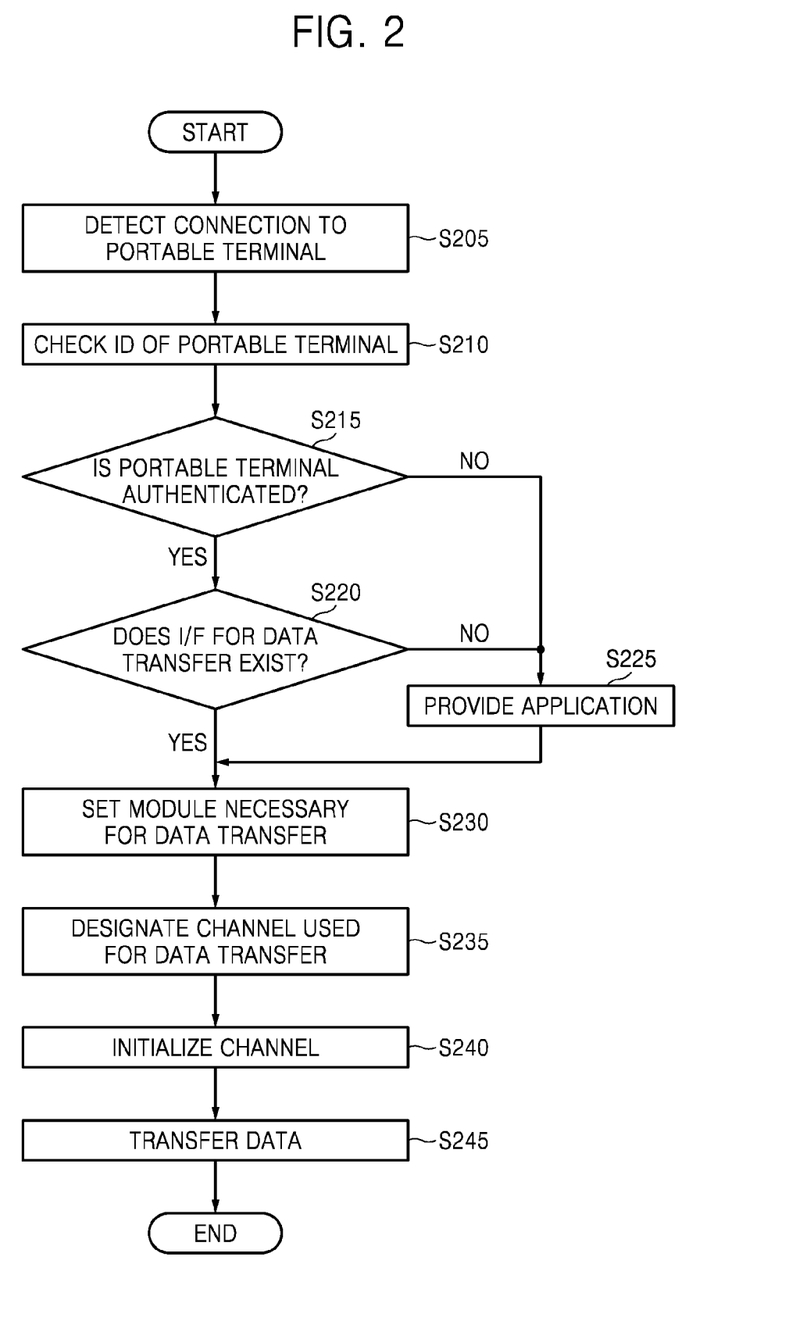
FIG. 2 is a flowchart illustrating a method of transferring data between a vehicle and a portable terminal according to an exemplary embodiment.

FIG. 2 is a flowchart of a method of transferring data between the vehicle 50 and the portable terminal 40 according to exemplary embodiments. Referring to FIGS. 1 and 2, the controller 12 detects whether the portable terminal 40 has been connected to the I/F device 10 in operation S205. In a case where the I/F device 10 is implemented in a form of a slot or shuttle, the controller 12 detects that the portable terminal 40 is connected to the I/F device 10 when a jack extending from the portable terminal 40 is inserted or connected to the I/F device 10. In another case, where the vehicle 50 and the portable terminal 40 communicate data via a wireless connection, the controller 12 detects whether the portable terminal 40 is able to communicate by determining whether the portable terminal 40 exists within a communication radius.

Thereafter, the controller 12 checks identification (ID) of the portable terminal 40 in operation S210. At this time, the portable terminal 40 may receive ID from the vehicle 50. The controller 12 determines whether the ID of the portable terminal 40 is authenticated in operation S215. In other words, for data communication between the two devices, the two devices need to have a standard agreed in advance and this can be confirmed through authentication.

When it is determined that the portable terminal 40 is not authenticated, the controller 12 provides an application or a software package, which includes a communication function, to the portable terminal 40 in operation S225. The portable terminal 40 may download the application or the software package through the I/F device 10. In this case, data transfer may be limited. The application or the software package may be stored in the memory 20.

When it is determined that the portable terminal 40 is authenticated, the controller 12 determines whether the portable terminal 40 includes I/F enabling data transfer in operation S220. When it is determined that the portable terminal 40 does not include the I/F, the controller 12 provides an application for communication to the portable terminal 40 in operation S225.

After the authentication and the existence of the communication I/F is confirmed, the controller 12 sets (selects) a module for data transfer in operation S230. The module may include the image I/F module 11-1, the sensor I/F module 11-2, and the car network I/F module 11-3. The controller 12 may set at least one of the modules 11-1 through 11-3.

Next, the controller 12 designates a channel to be used for data transfer in operation S235. Thereafter, the controller 12 initializes or synchronizes the designated channel in operation S240. Thereafter, the controller 12 starts and controls data transfer in operation S245. At this time, data may be converted using the TCP/IP before being transferred to the portable terminal 40.

Figure 3A:
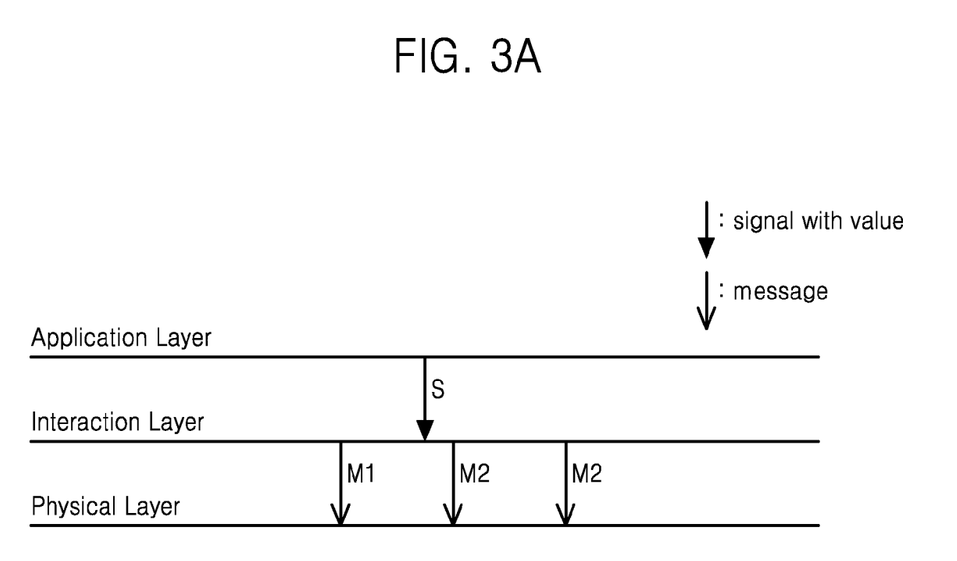
FIGS. 3A through 3C are schematic diagrams illustrating a method of transferring a message using a controller area network (CAN) protocol according to an exemplary embodiment.
Figure 3B:
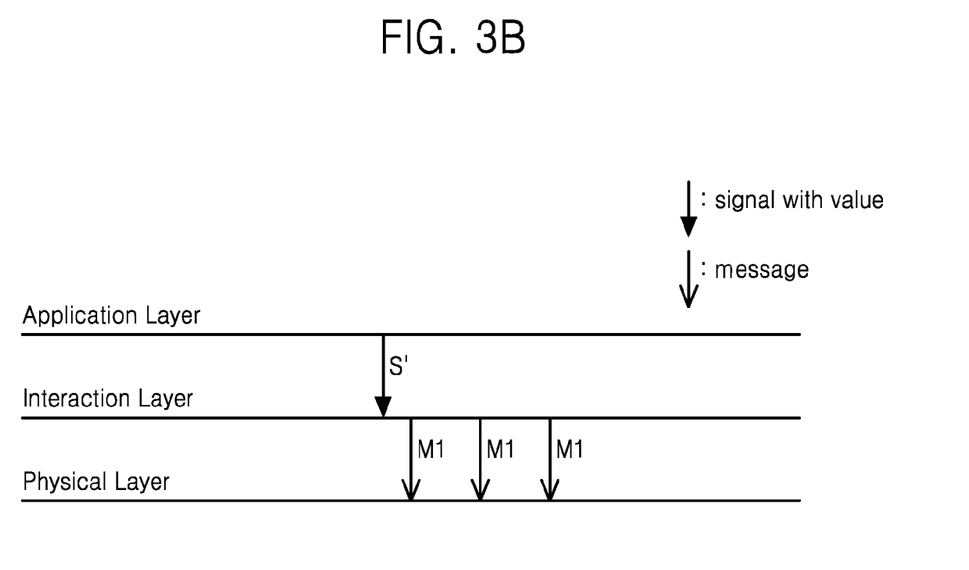
Figure 3C:
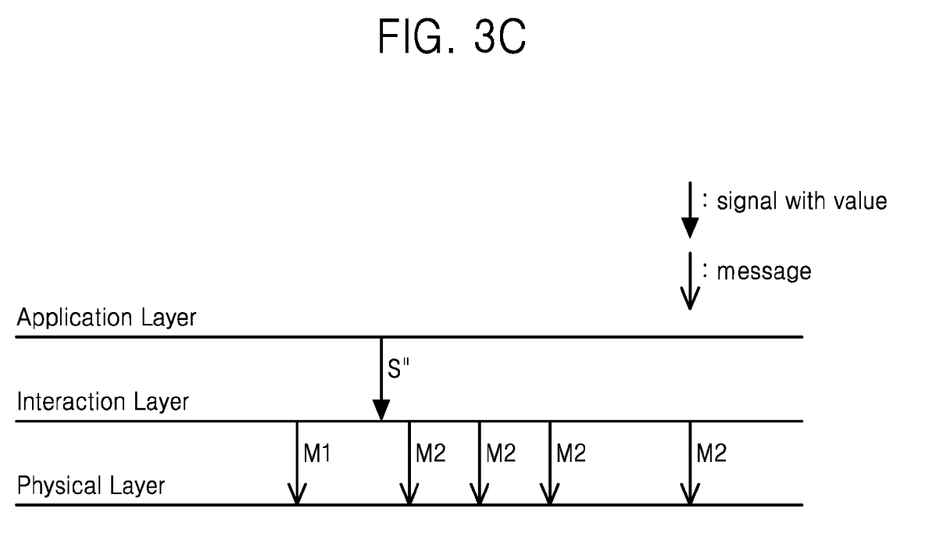

FIGS. 3A through 3C are schematic diagrams for explaining a method of transferring a message using a CAN protocol according to an exemplary embodiment. As described above, electronics and ECUs can transmit and receive data using network communication in a vehicle. At this time, communication based on the CAN protocol may be used. In this case, data may be manifested in CAN messages which may be divided into periodic messages and event messages. The structure of the CAN protocol includes an application layer, an interaction layer, and a physical layer. According to the CAN protocol, when a signal with a value is received, event data may be embedded in a periodic message instead of directly generating a CAN message.

For instance, as illustrated in FIG. 3A, a signal S may be transferred from the application layer to the interaction layer and then embedded in a periodic message M2 to be transferred to the physical layer. As an alternative, as illustrated in FIG. 3B, a signal S' may be transferred from the application layer to the interaction layer and then transferred together with a periodic message M1 to the physical layer. At this time, the periodic message M1 may be transferred three times. Alternatively, as illustrated in FIG. 3C, a signal S" is transferred from the application layer to the interaction layer and then a CAN message M2 is transferred in a form of an event message to the physical layer a predetermined number of times. Thereafter, in the designated period, a CAN message may be transferred in a form of a periodic message.

In an exemplary embodiment, information from the control units such as an engine management system (EMS), a transmission control unit (TCU), and an air bag and information about the rotation state of an engine, internal temperature, external temperature, an ignition switch, a vehicular speed, battery voltage, and so on are transferred to the portable terminal 40 using a communication method such as a CAN, serial communication, or FlexRay, so that a driver of a vehicle can easily check various information on the vehicle.

The inventive concept can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. As an alternative to the computer readable recording medium, the inventive concept may be embodied as computer readable codes in carrier waves.

As described above, according to an exemplary embodiment, data generated in a vehicle is efficiently transferred to an external portable terminal, thereby increasing the connectivity between the vehicle and the portable terminal.

While exemplary embodiments have been particularly shown and described, it will be understood by those of ordinary skill in the art that various changes in forms and details may be made therein without departing from the spirit and scope of the present invention as defined by the following claims.

What is claimed is:

1. A method of transferring data between a vehicle and a portable terminal, the method comprising:
   detecting connection of the portable terminal to the vehicle;
   checking an identification (ID) of the portable terminal;
   determining whether the portable terminal comprises interface enabling data
   transfer;
   setting a module necessary for the data transfer when the portable terminal is determined to comprise the interface; and
   starting the data transfer,
   wherein the vehicle comprises a controller that controls the detecting, the checking, the determining by checking an existence of the communication interface of the portable terminal, the setting, and the starting the data transfer by designating a channel to be used for data transfer and by initializing the channel,
   wherein the data is obtained from sensors installed in the vehicle and then stored in a memory directly through a communication unit, and
   wherein if the checking determines that the identification of the portable terminal is not authenticated, the controller performs a control operation to provide an application enabling the data transfer to the portable terminal.

2. The method of claim 1, further comprising, if the portable terminal is determined not to have the interface enabling the data transfer, providing an application enabling the data transfer to the portable terminal.

3. The method of claim 1, wherein the setting the module comprises setting at least one module selected from an image module, a sensor module, and a car network module.

4. The method of claim 1, further comprising designating a channel to be used for the data transfer, wherein the designating the channel comprises initializing the channel.

5. The method of claim 1, wherein the starting the data transfer comprises converting the data using a transmission control protocol/Internet protocol (TCP/IP).

6. An interface device for transferring data between a vehicle and a portable terminal, the interface device comprising:
   an image interface module, implemented on a computer, which transmits an image taken inside or outside the vehicle to the portable terminal;
   a sensor interface module which transmits sensor data from at least one sensor installed in the vehicle to the portable terminal;
   a car network interface module which transmits at least one between car system data and multimedia system data to the portable terminal; and
   a controller which checks identification of the portable terminal, designates a channel to be used for the data transfer, and controls the data transfer between the vehicle and the portable terminal by initializing the channel,
   wherein the data is obtained from sensors installed in the vehicle and then stored in a memory directly through a communication unit, and
   wherein if the controller determines that the identification of the portable terminal is not authenticated, the controller performs a control operation to provide an application enabling the data transfer to the portable terminal.

7. The interface device of claim 6, wherein the controller controls the interface device to transfer the data using at least one module selected from the image interface module, the sensor interface module, and the car network interface module based on the identification of the portable terminal or a type of the data.

8. A method of transferring data between a vehicle and a portable device, the method comprising:
   detecting the data for transfer when the portable device is connected to the vehicle via an interface unit;
   checking an identification (ID) of the portable device;
   determining by the interface unit a communication protocol from the plurality of communication protocols for the transmission of data from a source to a memory based on format protocol of the data for transfer; and
   determining by the interface unit an interface module from a plurality of interface modules for the transmission of data from the vehicle to the portable device based on data content type, and
   wherein the vehicle comprises a controller that controls the detecting, the checking, the determining by checking an existence of the communication interface of the portable terminal, and the data transfer by designating a channel to be used for data transfer and by initializing the channel,
   wherein the data is obtained from sensors installed in the vehicle and then stored in a memory directly through a communication unit, and
   wherein if the checking determines that the identification of the portable terminal is not authenticated, the controller performs a control operation to provide an application enabling the data transfer to the portable terminal.

9. The method of claim 8, wherein the data content type comprises image data, sensor data, and car network data, and wherein each type of content has a respective dedicated interface module.

10. The method of claim 9, wherein each transfer rate provided by the plurality of interface modules is different from each other and wherein the car network data comprises data output from electronics in the vehicle and data output from an electronic control unit.

11. The method of claim 8, wherein:
    the plurality of communication protocols comprise controlled area network protocol, local interconnect network data protocol, serial communication data protocol, FlexRay data protocol, and media oriented systems transport communication protocol, and
    the data for transfer is converted to a TCP/IP protocol for transmission to the portable device.

12. The method of claim 8, further comprising wherein the memory is provided in the vehicle and is partitioned into sections that correspond to each of the plurality of the communication protocols.

13. The method of claim 8, wherein the interface unit is implemented in a form of at least one slot, shuttle, or a base station.

14. The method of claim 8, wherein the portable device is connected to the vehicle via a wired communication line.

15. An interface apparatus for facilitating transfer of data between a portable device and a vehicle, the interface apparatus comprising:
- a processor executing software modules comprising:
- an image interface module which obtains image data from a memory and transmits the obtained data to the portable device;
- a sensor interface module which obtains sensor data from a memory and transmits the obtained data to the portable device;
- a car network interface module which obtains electronics data provided to the memory from electronic units in the vehicle and transmits the obtained data to the portable device; and
- a controller which checks identification of the portable terminal, designates a channel to be used for the data transfer, and controls the data transfer between the vehicle and the portable terminal by initializing the channel,
- wherein the image interface module, the sensor interface module, and the car network interface module are each dedicated to a respective type of data, and
- wherein the data is obtained from sensors installed in the vehicle and then stored in a memory directly through a communication unit, and
- wherein if the controller determines that the identification of the portable terminal is not authenticated, the controller performs a control operation to provide an application enabling the data transfer to the portable terminal.

16. The interface apparatus according to claim 15, wherein the interface apparatus is a base station.

17. The interface apparatus according to claim 15, wherein the interface apparatus is at least one slot for insertion of the portable device.

18. The interface apparatus according to claim 17, wherein the at least one slot comprises a plurality of slots, each of which is dedicated to a respective module selected from the image interface module, the sensor interface module, and the car interface module.

* * * * *